US012370111B2

(12) United States Patent
Schopler et al.

(10) Patent No.: US 12,370,111 B2
(45) Date of Patent: *Jul. 29, 2025

(54) ANTERIOR CERVICAL POSITIONING SYSTEM

(71) Applicant: BONE FOAM, INC., Corcoran, MN (US)

(72) Inventors: Steven A. Schopler, Bakersfield, CA (US); Choll W. Kim, San Diego, CA (US); Benjamin J. Watters, III, Saint Louis Park, MN (US); Clinton J. Mccullough, Blaine, MN (US); Peter A. Cole, Jr., North Oaks, MN (US)

(73) Assignee: BONE FOAM, INC., Corcoran, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,339

(22) Filed: Mar. 29, 2024

(65) Prior Publication Data

US 2024/0261168 A1 Aug. 8, 2024

Related U.S. Application Data

(63) Continuation of application No. 17/175,602, filed on Feb. 12, 2021, now Pat. No. 11,963,911.

(Continued)

(51) Int. Cl.
*A61G 13/00* (2006.01)
*A61G 13/12* (2006.01)

(52) U.S. Cl.
CPC ....... *A61G 13/121* (2013.01); *A61G 13/1225* (2013.01); *A61G 13/1245* (2013.01); *A61G 13/1295* (2013.01); *A61G 2200/327* (2013.01)

(58) Field of Classification Search
CPC ........ A61F 5/37; A61F 5/3707; A61F 5/3761; A61F 5/3769; A61F 5/3776;

(Continued)

(56) References Cited

U.S. PATENT DOCUMENTS 3,152,802 A 10/1964 Raymond et al.
3,162,486 A 12/1964 Emery (Continued)

FOREIGN PATENT DOCUMENTS

DE 102009050183 A1 4/2011
EP 0845831 A2 6/1998

(Continued)

OTHER PUBLICATIONS

International Preliminary Report on Patentability received for PCT Patent Application No. PCT/U20S21/018059, mailed on Aug. 25, 2022, 9 pages.

(Continued)

*Primary Examiner* — Adam Baker
(74) *Attorney, Agent, or Firm* — Workman Nydegger

(57) ABSTRACT

A patient positioning system for positioning a patient in preparation for an anterior cervical spinal procedure includes a base section, an upper body support attachable to a superior portion of the base section and a lower body support attachable to an inferior portion of the base section. The upper body support is configured to support the head and upper torso of the patient in a manner that aids in opening cervical spine disk space. The lower body support is configured to comfortably lift and support the legs of the patient. A traction strap assembly is attachable to the base section and configured to extend from the base section up around the shoulders of the patient and along the anterior side of the patient to a lower terminal end to enable intermittent traction of the patient's shoulders.

22 Claims, 10 Drawing Sheets

Related U.S. Application Data

(60) Provisional application No. 62/976,176, filed on Feb. 13, 2020.

(58) Field of Classification Search
CPC . A61F 5/3784; A61G 13/121; A61G 13/1215; A61G 13/122; A61G 13/1225; A61G 13/123; A61G 13/1235; A61G 13/1245; A61G 13/125; A61G 13/1255; A61G 13/1285; A61H 1/02; A61H 1/0218; A61H 1/0222; A61H 1/0292
USPC .......................................................... 128/845
See application file for complete search history.

(56) References Cited

U.S. PATENT DOCUMENTS

| | | | | |
|---|---|---|---|---|
| 3,532,336 | A | 10/1970 | Baker | |
| 3,639,927 | A | 2/1972 | Munch | |
| D247,209 | S | 2/1978 | Woog | |
| D272,467 | S | 1/1984 | Nightingale | |
| 4,602,619 | A * | 7/1986 | Wolf | A61H 1/0222 D24/188 |
| 4,674,483 | A | 6/1987 | Frederick | |
| D296,364 | S | 6/1988 | Nippoldt et al. | |
| 4,821,355 | A * | 4/1989 | Burkhardt | A47G 9/10 5/636 |
| D301,166 | S | 5/1989 | Miklja | |
| 5,010,880 | A | 4/1991 | Lamb | |
| 5,067,483 | A | 11/1991 | Freed | |
| D328,349 | S | 7/1992 | Waldrop | |
| 5,147,287 | A | 9/1992 | Jewell et al. | |
| 5,279,310 | A | 1/1994 | Hsien | |
| D356,156 | S | 3/1995 | Boland | |
| D370,066 | S | 5/1996 | Kennemore | |
| 5,608,263 | A | 3/1997 | Drayton et al. | |
| 5,614,743 | A | 3/1997 | Mochizuki | |
| 5,915,168 | A | 6/1999 | Salatino et al. | |
| D413,982 | S | 9/1999 | Swedberg et al. | |
| 6,446,288 | B1 * | 9/2002 | Pi | A61G 7/072 5/636 |
| D552,244 | S | 10/2007 | Tinsley | |
| D555,251 | S | 11/2007 | Riach | |
| 7,665,165 | B2 * | 2/2010 | Maganov | A63B 21/4037 128/845 |
| 8,176,585 | B1 * | 5/2012 | Isham | A61G 13/123 5/710 |
| D698,030 | S | 1/2014 | Crisco et al. | |
| D841,165 | S | 2/2019 | McCormack et al. | |
| 10,406,017 | B2 | 9/2019 | Parent et al. | |
| D954,967 | S | 6/2022 | Watters et al. | |
| D954,975 | S | 6/2022 | Potter et al. | |
| 11,963,911 | B2 * | 4/2024 | Schopler | A61G 13/121 |
| 2006/0021146 | A1 | 2/2006 | Tokarz | |
| 2011/0144755 | A1 | 6/2011 | Baynham et al. | |
| 2012/0110742 | A1 | 5/2012 | Lawler et al. | |
| 2012/0180219 | A1 | 7/2012 | Riccabona | |
| 2014/0224262 | A1 * | 8/2014 | Parent | A61B 6/0421 128/878 |
| 2017/0151116 | A1 * | 6/2017 | Baker | A61G 13/1295 |
| 2021/0251836 | A1 | 8/2021 | Schopler et al. | |

FOREIGN PATENT DOCUMENTS

| | | | |
|---|---|---|---|
| EP | 0851492 | A2 | 7/1998 |
| EP | 0969509 | A1 | 1/2000 |
| EP | 1014443 | A1 | 6/2000 |
| WO | 98/47340 | A1 | 10/1998 |
| WO | 2011/047802 | A1 | 4/2011 |
| WO | 2017/098463 | A1 | 6/2017 |

OTHER PUBLICATIONS

International Search Report and Written Opinion received for PCT Patent Application No. PCT/US21/18059, mailed on Apr. 23, 2021, 11 pages.

Spine Positioning System. Online, published date unknown. Retrieved on Sep. 13, 2022 from URL: https://ibodycare.com/products/ spine-positioning-system.

Supplementary European Search Report received for EP Patent Application No. 21753184.7, mailed on Feb. 5, 2024, 8 pages.

* cited by examiner

ANTERIOR CERVICAL POSITIONING SYSTEM

CROSS-REFERENCE TO RELATED APPLICATIONS

This application is a continuation of U.S. patent application Ser. No. 17/175,602, filed Feb. 12, 2021, which claims the benefit of U.S. Provisional Application No. 62/976,176, filed Feb. 13, 2020, which is incorporated by reference in its entirety.

BACKGROUND

Proper positioning of patients in preparation for spine surgery is extremely important in order to provide good operating conditions and effective access to the operative site. During spine surgery, patients are typically placed in positions that are not completely physiologic, and need to be stabilized and maintained in those positions for considerable amounts of time. Improper positioning of the patient can lead to complications resulting in severe patient disability and functional loss.

One complication related to improper patient positioning, including patient positioning during spine surgery, is perioperative peripheral nerve injury (PPNI). PPNI may be caused by direct trauma to affected nerve fibers or by ischemia of the nerve fibers. Prolonged stretching of peripheral nerves may lead to an increase in intraneural pressure and compression of intraneural capillaries and venules, which leads to a reduction in the perfusion pressure of the nerve fibers and associated disruption of axons and vasa nervosum. Prolonged compression may lead to an increase in intraneural and extraneural pressures, leading to a reduction in perfusion and therefore leading to ischemia and slowing of conduction through the nerve fibers. Prolonged ischemia of nerve fibers leads to demyelination and associated axonal damage. Specific forms of PPNI include ulnar neuropathy, brachial plexus injuries, median neuropathy, radial neuropathy, and heel pressure ulcers from prolonged pressure on heels during supine patient positioning which is used in anterior cervical spine procedures.

Further, patients come in a variety of shapes and sizes, and each therefore has unique positioning needs to provide the best access to the surgical site. The diversity of patient anatomy, as well as the significance of the damage that can result from improper positioning, underscore the challenges involved in spinal surgery patient positioning.

The supine position is used for anterior approach procedures such as anterior lumbar interbody fusion (ALIF), supine approach artificial disc replacement (ADR), anterior cervical discectomy and fusion (ACDF), and anterior cervical corpectomy and fusion (ACCF). During ALIF and ADR procedures, the patient is typically positioned in the supine position with an inflatable bag placed underneath the lumbar spine in order to exaggerate the lumbar lordosis and open the anterior disc space.

For anterior cervical procedures (such as ACDF and ACCF), the surgeon needs the patient positioned in a supine position with the neck gently extended. This is typically done by placing a bump (such as rolled sheets/towels or an inflatable bag) under the scapulae. The surgeon also needs to provide intermittent traction to the shoulders for intraoperative radiographic visualization of the lower cervical vertebrae. Tape is usually adhered to the shoulders and intermittently pulled toward the bottom of the bed to move the shoulders inferiorly to allow better radiographic visualization of the lower cervical spine. Typically, someone in the operating room simply pulls on the two sections of tape in the inferior direction when traction is needed.

The potential complications described above highlight the need for proper and safe patient positioning while also allowing the surgeon to gain effective access in a manner that minimizes procedure time.

The conventional approaches for anterior cervical positioning have several limitations. For example, although tape is relatively inexpensive and readily available, its application takes time, it doesn't position or reposition well, it sticks to itself and is hard to handle, and it is not reusable. Other conventional positioning means include towels, pillows, and sheets. These can deform over time during the procedure, may take a lot of time to position, and may be overly bulky for some applications. The use of inflatable bags, such as IV bags, also involves limitations related to potential deflation, excessive time taken to inflate and position, and potential discomfort if over or under inflated.

Accordingly, there is an ongoing need for improved patient positioning systems. In particular, there is an ongoing need for an improved patient positioning system configured for positioning a patient in a supine position in preparation for an anterior cervical procedure.

SUMMARY

Described herein are patient positioning systems configured to position the cervical spine of a patient in preparation for an anterior cervical spine procedure, such as an anterior cervical discectomy and fusion (ACDF) or (anterior cervical corpectomy and fusion) ACCF procedure. In one embodiment, a patient positioning system includes a base section, an upper body support attachable to a superior portion of the base section, and a lower body support positionable on an inferior portion of the base section. The upper body support is configured to support the head and upper torso of the patient in a manner that aids in opening cervical spine disk space. The lower body support is configured to comfortably lift and support the legs of the patient and reduce compression and pressure on the heels.

The patient positioning system may also include a traction strap assembly attachable to the base section and configured to extend from the base section up around the shoulders of the patient and along the anterior side of the patient to a lower terminal end. The traction strap assembly is configured to move the patient's shoulders inferiorly when the terminal end is pulled inferiorly, such as during intermittent imaging of the lower cervical spine.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

DETAILED DESCRIPTION

Positioning System Overview

Figure 1:
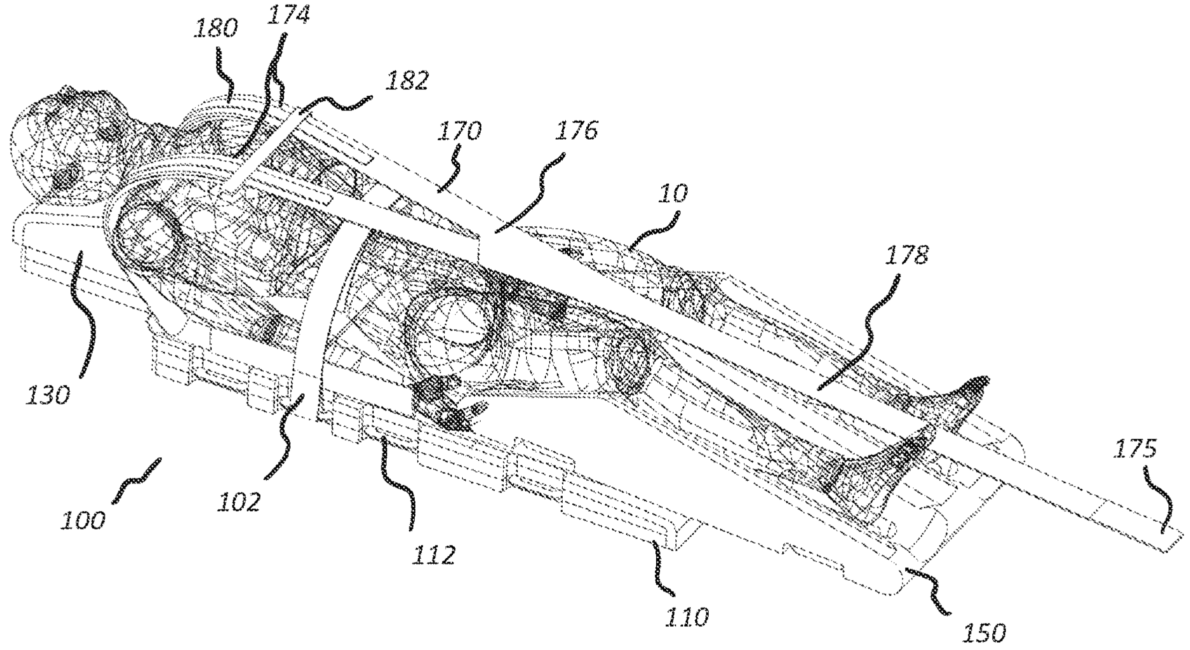
FIG. 1 illustrates a top isometric view of a patient positioning system configured for positioning a patient in preparation for an anterior cervical procedure, illustrating positioning of the patient thereon in the supine position.
Figure 2:
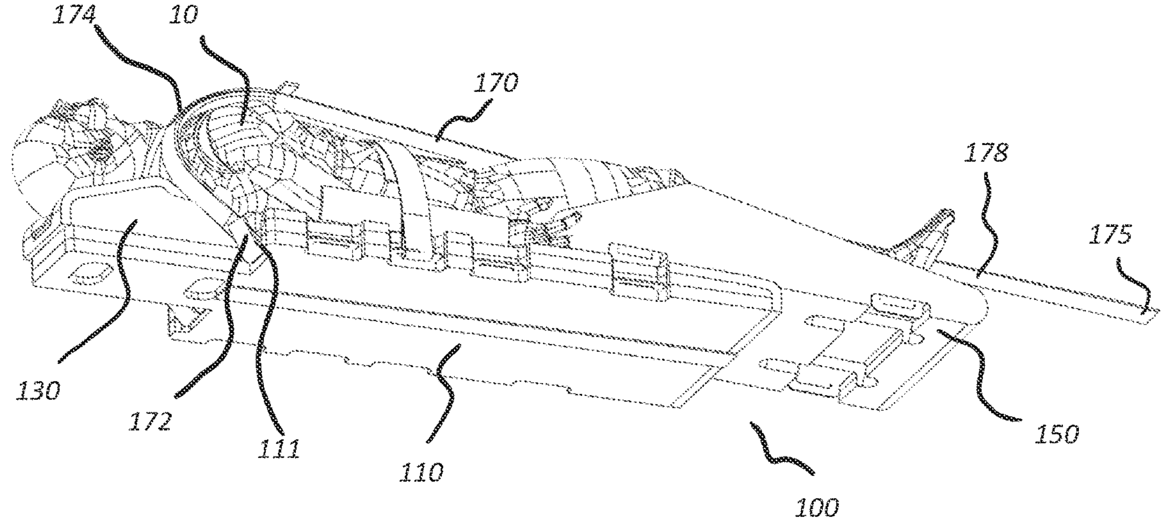
FIG. 2 illustrates a bottom isometric view of the patient positioning system of FIG. 1.
Figure 3:
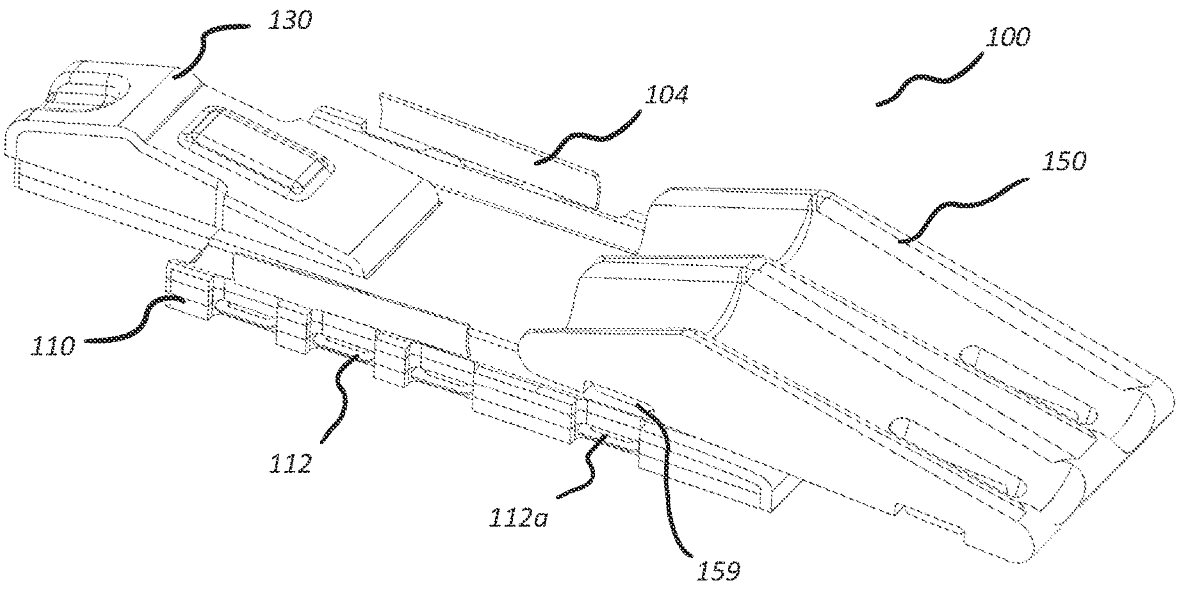
FIG. 3 illustrates the patient positioning system with patient and straps removed, illustrating the separable subcomponents of the system, including a base section, an upper body support connected to the base section, and a lower body support positioned upon the base section.

FIGS. 1 and 2 illustrate an exemplary patient positioning system 100 showing a patient 10 positioned thereon in a supine position. FIG. 3 illustrates another view of the positioning system 100 with the patient 10 and traction strap assembly 170 removed in order to better view some of the other components of the system.

As described in more detail below, the positioning system 100 includes multiple subcomponents that may be assembled to form the full positioning system 100 as illustrated. In this embodiment, the subcomponents include a base section 110, upper body support 130, lower body support 150, and a traction strap assembly 170. This allows the system 100 to be disassembled and more easily stored and then readily assembled when needed.

As shown, the positioning system 100 allows the patient 10 to be positioned in a supine position with the neck gently extended and in a position that provides access to the cervical spine. The legs are also supported and slightly raised at the knee joints to provide a comfortable, stable position for the lower body.

As shown in FIGS. 1 and 2, particularly FIG. 2, the traction strap assembly 170 includes two upper terminal ends 172 attachable to the base section 110. The upper terminal ends 172 extend to separate upper strap segments 174 that extend over the shoulders of the patient 10 before joining at a junction 176. A lower strap segment 178 joins the upper strap segments 174 at the junction 176 and extends inferiorly therefrom to a lower terminal end 175. Operating room staff may provide intermittent shoulder traction for better imaging of the lower cervical spine by pulling the lower terminal end 175 inferiorly.

The illustrated "Y" shape of the traction strap assembly 170 represents a preferred embodiment because it beneficially traverses both shoulders but also provides a single, readily manipulatable lower terminal end 175. This design thus allows for easy strap management, easy setup, and easy use in the operating room. It also avoids applying pressure to the patient's arms. Other embodiments, however, may have alternative configurations. For example, some embodiments may simply cross the two separate strap segments after they extend over the shoulders, may omit a junction 176, and/or may include two separate lower terminal ends rather than a single lower terminal end 175.

The upper terminal ends 172 may include fastener elements (e.g., hook and loop features) that allow a connection to corresponding upper strap supports 111 of the base section 110. The upper strap supports 111 may be formed as plates slotted for looping of the strap ends therethrough. While the illustrated strap, strap support, and fastener embodiments described herein are exemplary, other embodiments may additionally or alternatively include other strap hardware elements known in the art, such as clamps, clasps, buckles, cams, tiedowns, ratchets, and the like.

The straps of the traction strap assembly 170 preferably have a width of about 2 to about 4 inches, or about 2.25 to about 3.5 inches, or about 2.5 to about 3 inches. Straps of such sizes can comfortably distribute pressures across the shoulders when traction is applied, but are not so large as to abut against the patient's neck and/or overly crowd the surgical field.

Upper strap segments 174 may include padding 180, typically positioned on the underside of the strap where contact with the patient's shoulders is expected and/or wrapped around the corresponding portion of the strap, for example. The padding 180 may be in the form of a sleeve or sheath formed from foam and/or other suitably soft material to provide pressure relief to the shoulders during intermittent traction applied during imaging of the lower cervical spine. An adjustable yoke 182 may also be provided that crosses and engages with the upper strap segments 174 and functions to limit the distance between the upper strap segments 174 and prevent them from falling off the shoulder. The yoke 182 may be adjustable in length and/or by moving it to different positions along the superior/inferior axis.

One or more additional straps may also be attached to the positioning system 100 to further aid in restraining the patient in the desired position. For example, as shown, a torso/arm strap 102 may be attached to corresponding side strap supports 112 of the base section 110. The torso/arm strap 102 passes over the arms and midsection of the patient 10 and functions to prevent the patient's arms from falling off the operating table. Multiple different side strap supports 112 may be positioned along the longitudinal length of the base section 110 to allow for custom placement of straps based on differing patient anatomy (e.g., different arm lengths) and/or different particular procedural needs. The side strap supports 112 may also be utilized to secure the base section 110 to an operating table. Straps may additionally or alternatively be placed over other portions of the patient, such as the upper chest, pelvis, and/or thighs.

As best visible in FIG. 3, the positioning system 100 may also include one or more bumpers 104 positioned along a portion of a respective side of the positioning system in order to assist in keeping the patient positioned thereon. For example, the bumpers 104 may be attached to a portion of the base section 110 and extend upward therefrom. Preferably, the bumpers 104 extend along a portion of the base section 110 that coincides with a lower portion of the upper body support 130, but not all of the upper body support, and preferably the bumpers do not coincide with the lower body support 150. This positions the bumpers 104 where they are most able to effectively prevent patient falls, while also leaving upper and lower sections unencumbered. The positioning system 100 may additionally or alternatively include arm padding for wrapping or otherwise positioning around the patient's arms to protect against rubbing or pinching from straps that pass over that portion of the patient's arms.

Figure 8A:
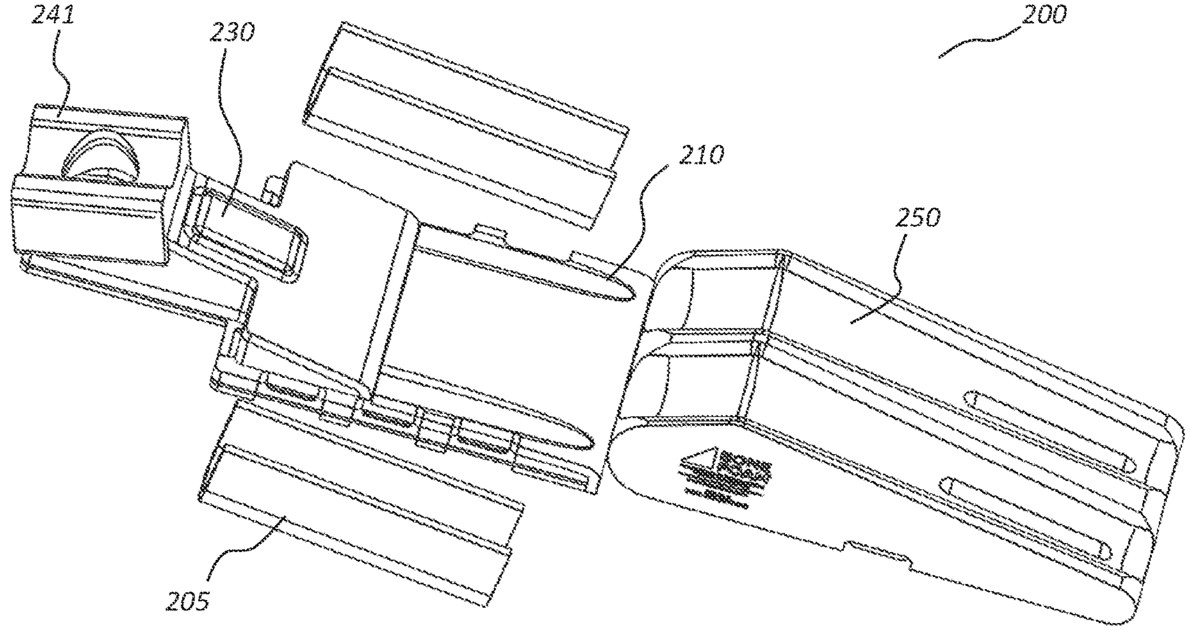
FIGS. 8A and 8B illustrate an alternative embodiment of a patient positioning system configured for positioning a patient in preparation for an anterior cervical procedure.

FIG. 8A illustrates an alternative embodiment of a patient positioning system 200. The patient positioning system 200 is similar in many regards to the patient positioning system 100, and the description herein related to the patient positioning system 100 is also applicable to the patient positioning system 200, and it will be understood that by highlighting certain differences, this disclosure is not intended to omit any of the other features of the other embodiments. Similarly, features of the patient positioning system 200 may also be utilized with the patient positioning system 100.

The patient positioning system 200 includes a base section 210, upper body support 230, lower body support 250, and a traction strap assembly (not shown). The illustrated embodiment also includes a pair of arm pads 205 and an occipital pad 241 that can be used in conjunction with the other components of the system 200. The arm pads 205 may be wrapped or otherwise positioned around the patient's arms to protect against rubbing or pinching from straps that pass over that portion of the patient's arms. The occipital pad 241 and can be positioned on the upper body support 230 such that the included aperture aligns with the underlying head depression of the head section. the occipital pad can add additional support and cushioning of the patient's head and neck. In some embodiments, the arm pads 205 and/or occipital pad 241 are made of open foam and are intended to be disposable, whereas the other components include a polymer coating that allows for sterilization and reuse.

In the illustrated embodiment, the base section 210 (also shown independently in FIG. 8B) is shorter than in the patient positioning system 100. Whereas the base section 110 of the system 100 extends inferiorly such that the lower body support 150 sits upon the upper surface of the base section 110 (see FIG. 1), the base section 210 has a shorter length such that the lower body support 250 can be properly positioned by placement adjacent to the base section 210.

Base Section

Figure 4A:
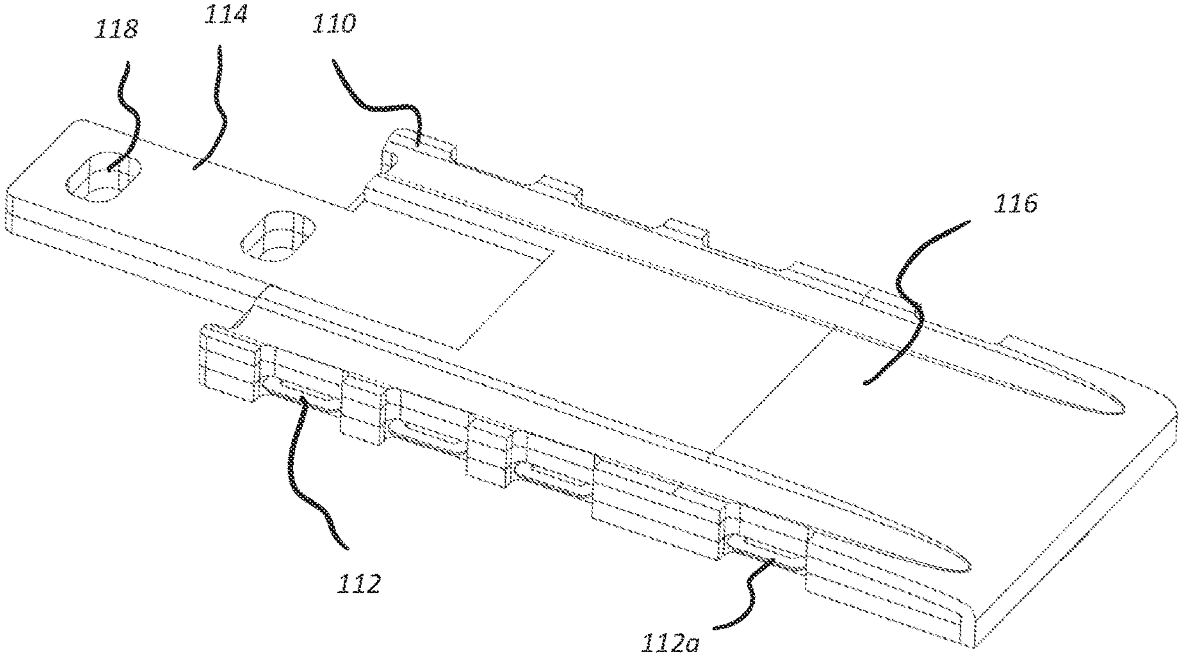
FIG. 4A illustrates a detailed view of the base section.

FIG. 4A provides a view of the base section 110 with other components of the positioning system removed. The base section 110 includes a superior portion 114 and an inferior portion 116. The superior portion 114 is configured for receiving the upper body portion 130 and the inferior portion 116 is configured for cushioning the patient's glutes and upper hamstrings. The lower body portion 150 is also able to be positioned upon the inferior portion 116, as shown in FIG. 3. The superior portion 114 may include one or more connection elements 118 configured to assist in connecting the base section 110 to the upper body support 130.

The connection elements 118 may be in the form of apertures, as shown, that are sized and shaped to receive corresponding projections that fit within the apertures. In other embodiments, the connection elements 118 may take additional or alternative forms. For example, the base section 110 may include one or more projections while the upper body portion 130 includes one or more apertures. The upper body support 130 and base section 110 may additionally or alternatively be strapped together, attached using hook and loop fasteners, attached by friction fit, or combination thereof.

The lower body support 150 may be attached to the base section 110 in a similar manner. In a presently preferred embodiment, however, the lower body support 150 is attached to the base section 110 by aligning strap supports 159 (see FIG. 3) of the lower body support 150 to side strap supports 112 of the base section 110 and providing straps through the aligned strap supports on either or both sides of the positioning system. Because the base section 110 may include multiple side strap supports 112 along its length, the lower body support 150 may be attached at different locations along the length of the base section 110 according to particular patient and/or procedural needs. Most commonly, however, the lower body portion 150 can be freely rested upon the desired portion of the base section 110 and held sufficiently in place by friction between the lower body support 150 and the base section 110.

The base section 110 preferably has a width of about 16 to about 22 inches, or more preferably a width of about 18 to about 20 inches. Such a width fits well upon most standard operating tables and allows easy attachment to standard operating tables without having overhanging and/or encumbering sections. The base section 110 may have an overall length of about 30 to about 55 inches, such as about 35 to about 50 inches, or about 40 to about 45 inches.

Figure 4B:
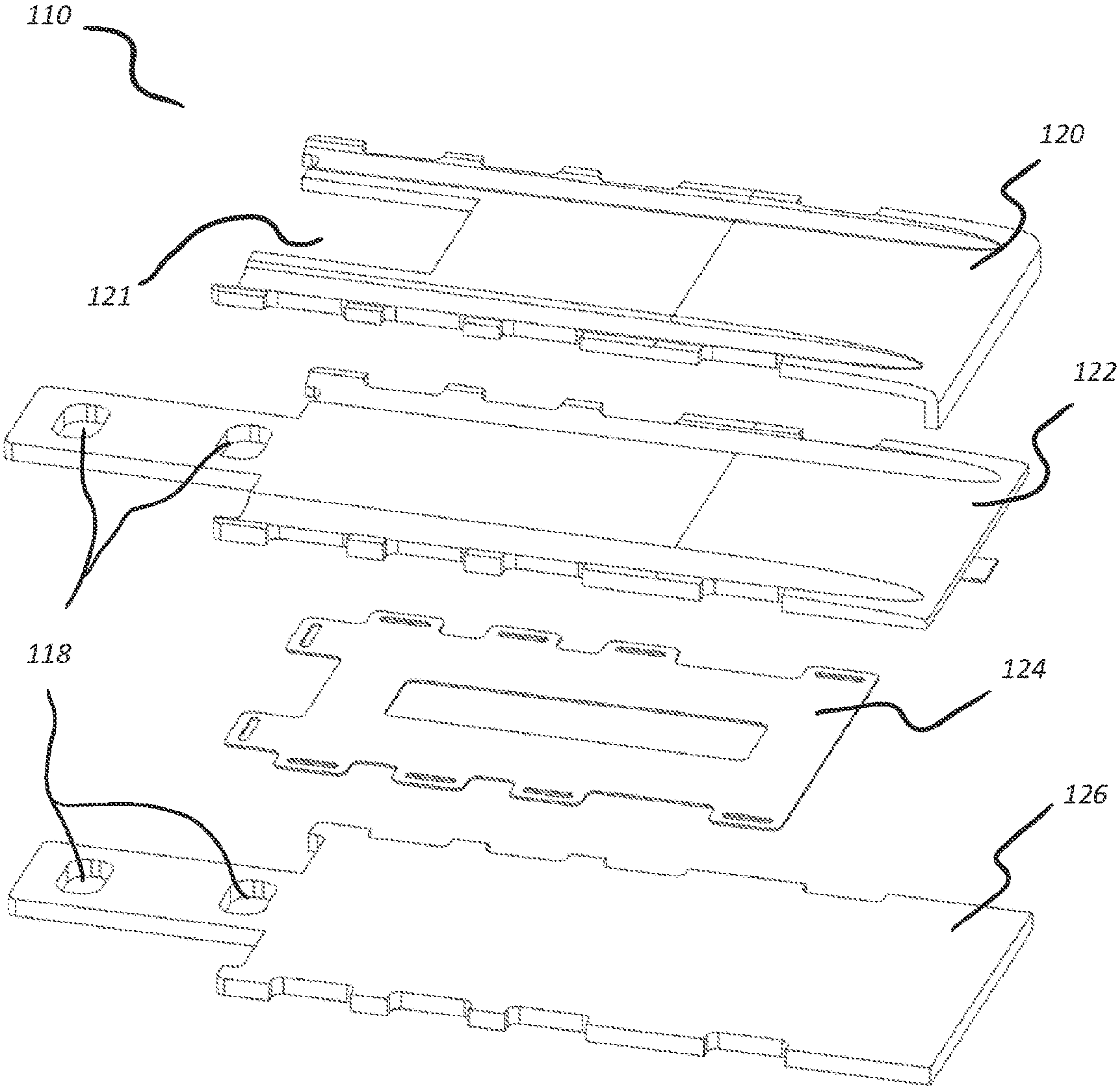
FIG. 4B illustrates an exploded view of the base section.

FIG. 4B illustrates an exploded view of the base section 110 in order to show various layers that may be included in the base section 110. The base section 110 may include an upper layer 120, an intermediate layer 122, and a lower layer 126. A strap support layer 124 that forms the structure of each of the strap supports is also provided between the upper layer 120 and lower layer 126, preferably between the intermediate layer 122 and lower layer 126.

The strap support layer 124 is preferably formed as a single piece to thereby integrate each strap support into a single structural component. This beneficially enables forces applied to the strap supports to be better spread across the strap support layer 124 rather than focused at smaller regions of the system. As explained in more detail below, several of the other layers may be formed from a foam material, and better spreading applied forces beneficially reduces the risk that such foam materials, and/or the strap supports themselves, are damaged.

The upper layer 120 is preferably formed from a soft, viscoelastic "memory" foam material to conform to the patient's body and prevent soft tissue injuries. Such memory foam materials typically have a 25% indentation load deflection (ILD) of about 10 to about 40 pounds, or more preferably about 20 to about 35 pounds. The foam material of the upper layer 120 may have a density of about 3 to about 9 pounds per cubic foot (PCF), preferably about 4 to about 8 PCF, or about 5 to about 7 PCF. The upper layer 120 may have a thickness of about 0.25 inch to about 1.25 inch, such as about 0.5 inch to about 1 inch.

As shown, the upper layer 120 may also include a cutout 121 at an upper end to allow the upper body support 130 to be positioned therein. That is, the upper body support 130 sits atop the intermediate layer 122 rather than the upper layer 120 when the positioning system 100 is assembled.

The intermediate layer 122 is preferably formed from a foam material with greater firmness than the upper layer 120 to provide stability to the overall structure of the base section 110 and to provide stability for making strap connections to the operating table, patient, and/or other components of the positioning system 100. The intermediate layer 122 may have an indentation load deflection (ILD) of at least about 50 pounds, more preferably at least about 75 pounds or at least about 100 pounds, such as an ILD within a range of about 50 to about 150 pounds, or about 75 to 135 pounds, or about 100 to about 120 pounds. The density of the intermediate layer 122 may be about 1 to about 4 PCF, such as about 1.5 to about 3 PCF. In some embodiments, the intermediate layer 122 may be formed from a #2 XLPE (cross-linked polyethylene) and/or other foam material(s) having similar density and ILD properties.

The lower layer 126 is preferably less firm than the intermediate layer 122, but more firm than the upper layer 120. For example, the lower layer 122 may have a firmness that allows it to provide some structural support to the base section 110 and to pad the strap support layer 124 but to also compress somewhat under typical patient weight. The lower layer 122 may be formed from #2 XLPE and/or other foam material(s) having similar density and ILD properties. The connection elements 118 are formed in the intermediate layer 122 and/or lower layer 126.

Figure 8B:
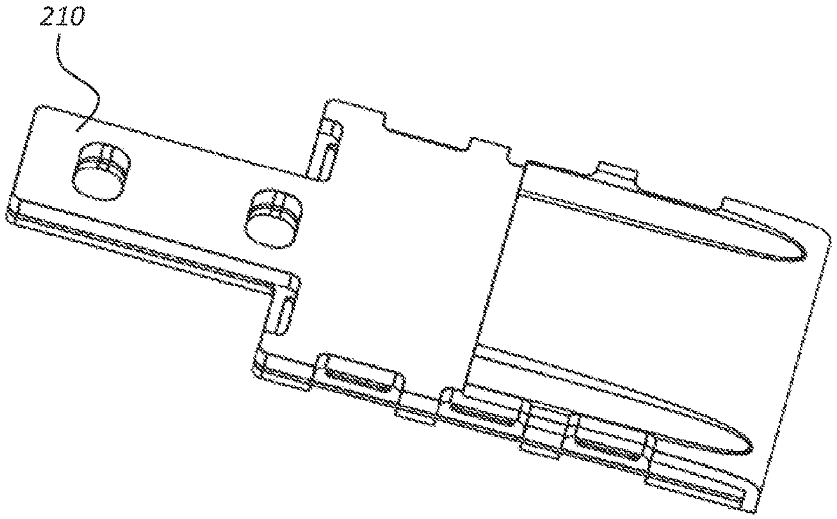

The alternative base section 210 shown in FIGS. 8A and 8B may also include the features (e.g., layers, foam properties, etc.) discussed herein with respect to the base section 110.

Upper Body Support

Figure 5:
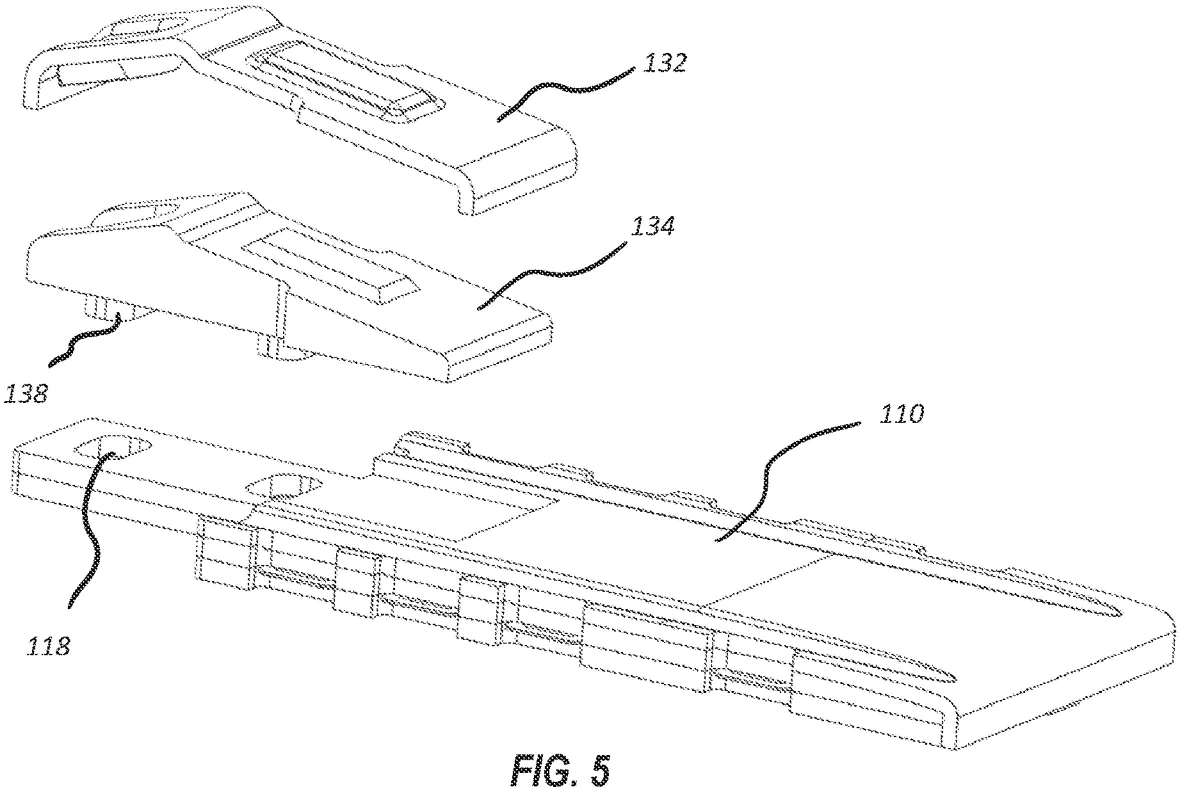
FIG. 5 illustrates an exploded view of the upper body support showing how the upper body support may be coupled to the base section.

FIG. 5 illustrates the base section 110 and an exploded view of the upper body support 130 to show the different layers of the upper body support 130 and to show how the upper body support 130 can be aligned to allow the connection elements 138 (e.g., projections) of the upper body support 130 to engage with the connection elements 118 of the base section 110.

As shown, the upper body support 130 may include multiple layers, including an upper layer 132 and a lower layer 134. The upper layer 132 may be similar to the upper layer 120 of the base section 120. That is, the upper layer 132 may be formed from a soft, viscoelastic "memory" foam material (e.g., with an ILD of about 10 to about 40 pounds or about 20 to about 35 pounds) to conform to the patient's body and prevent soft tissue injuries, such as a polymer foam material having a density of about 3 to about 9 pounds per cubic foot (PCF), preferably about 4 to about 8 PCF, or about 5 to about 7 PCF. The upper layer 132 may have a thickness of about 0.25 inch to about 1.25 inch, such as about 0.5 inch to about 1 inch.

The lower layer 134 is preferably firmer than the upper layer to provide support to the overall structure of the upper body support 130. For example, the lower layer 134 may have an ILD of at least about 30 pounds, preferably at least about 55 pounds or at least about 80 pounds, such as an ILD within a range of about 50 to about 140 pounds, or about 75 to about 135 pounds, or about 100 to about 120 pounds. The density of the lower layer 134 may be about 1 to about 4 PCF, such as about 1.5 to about 3 PCF.

Figure 6:
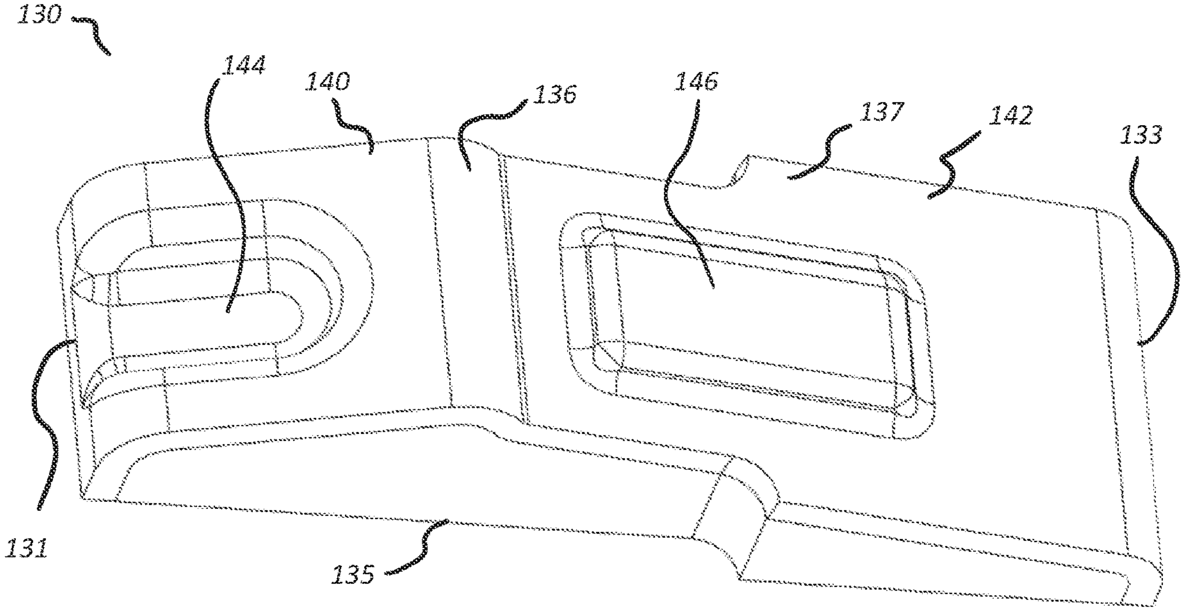
FIG. 6 illustrates a detailed view of the upper body support.

FIG. 6 is a detailed view of the upper body support 130. The upper body support 130 includes a bottom surface 135 (from which the connection elements 138 extend) and an upper surface 137. An apex 136 extends laterally and forms a part of the upper surface 137. The apex 136 has a curved upper surface and is configured to lift and support the patient's neck. For example, the apex 136 may have a curved upper surface that curves upward from a superior end of the scapulae section 142 to form an upper surface of the head section 140.

The apex 136 preferably sits at a height above the bottom surface 135 of about 2.5 to about 5.5 inches, more preferably about 3 to about 5 inches, such as about 3.5 to about 4.5 inches. A height within the foregoing ranges provides sufficient lift to put the patient's cervical spine in a desired position without being so high as to overly curve the cervical spine and/or cause the patient's head to tilt back excessively.

A head section 140 extends downward and in a superior direction from the apex 136 until reaching the bottom surface 135. A scapulae section 142 extends downward and in an inferior direction from the apex 136 until reaching the bottom surface 135.

The head section 140 includes a head depression 144 that sits lower than the remainder of the head section 140 and thereby allows the patient's head to sink into and be cradled by the support material bordering the head depression 144. As shown, the head depression 144 is open toward the distal end 131 of the upper body support 130 but closed on the side facing the apex 136. This leaves the apex 136 raised relative to the head depression 144 and allows it to lift and support the patient's neck somewhat higher than the patient's head as compared to if the patient were to lie supine on a flat surface. The head depression 144 can thus be formed in a "U-shape" with an open portion of the U-shape facing the superior direction.

The head section 140 may slope downward from the apex 136 to provide effective patient positioning for an anterior cervical spine procedure. The head section 140 may be substantially horizontal (i.e., 0° slope), or may slopes downward from the apex 136 (i.e., slopes upward from the bottom surface 135) at an angle of about 5° to about 25°, more preferably about 10° to about 18°, such as about 15°. Such slope angles have been found to provide effective head and neck positioning for anterior cervical spine procedures.

The scapulae section 142 is configured to raise and support the patient's upper torso. The scapulae section 142 typically has a length greater than a length of the head section 140, and thus slopes downward from the apex 136 at a lower angle than does the head section 140. For example, the scapulae section 142 may slope downward from the apex 136 (i.e., may slope upward from the bottom surface 135) at an angle of about 5° to about 20°, preferably about 7° to about 15°, such as about 10°. Such slope angles have been found to provide effective positioning of the upper torso in preparation for anterior cervical spine procedures.

The scapulae section 142 also includes a scapular bump 146 projecting upwards from the remainder of the upper surface 137 of the scapulae section 142. The scapular bump 146 beneficially lifts and supports the portion of the patient's back between the scapulae, functioning to gently open the chest and allow the shoulders to sink downward relatively. In combination with the size and shape of the apex 136 and the head depression 144, these features provide effective patient positioning in preparation for an anterior cervical spine procedure. The scapular bump 146 preferably projects about 0.25 to about 0.75 inch above the remainder of the upper surface 137 of the scapulae section 142.

A portion of the scapulae section 142 may have a width greater than a width of the head section 140. For example, the more inferior portion of the scapulae section 142 may include a flared, greater width as compared to the width of the remainder of the upper body support 130. The greater width may be utilized to provide additional surface at the locations that coincide directly with the base section 110. The region of greater width may also better support the lower torso and hips of the patient.

At the same time, the smaller width of the more superior portions of the upper body support are configured to provide sufficient patient support without overly encumbering the areas where a surgeon and/or equipment are likely to be active during a surgical procedure (i.e., the areas near the access site) and also allow more desirable positioning of the patient's shoulders.

Figure 9:
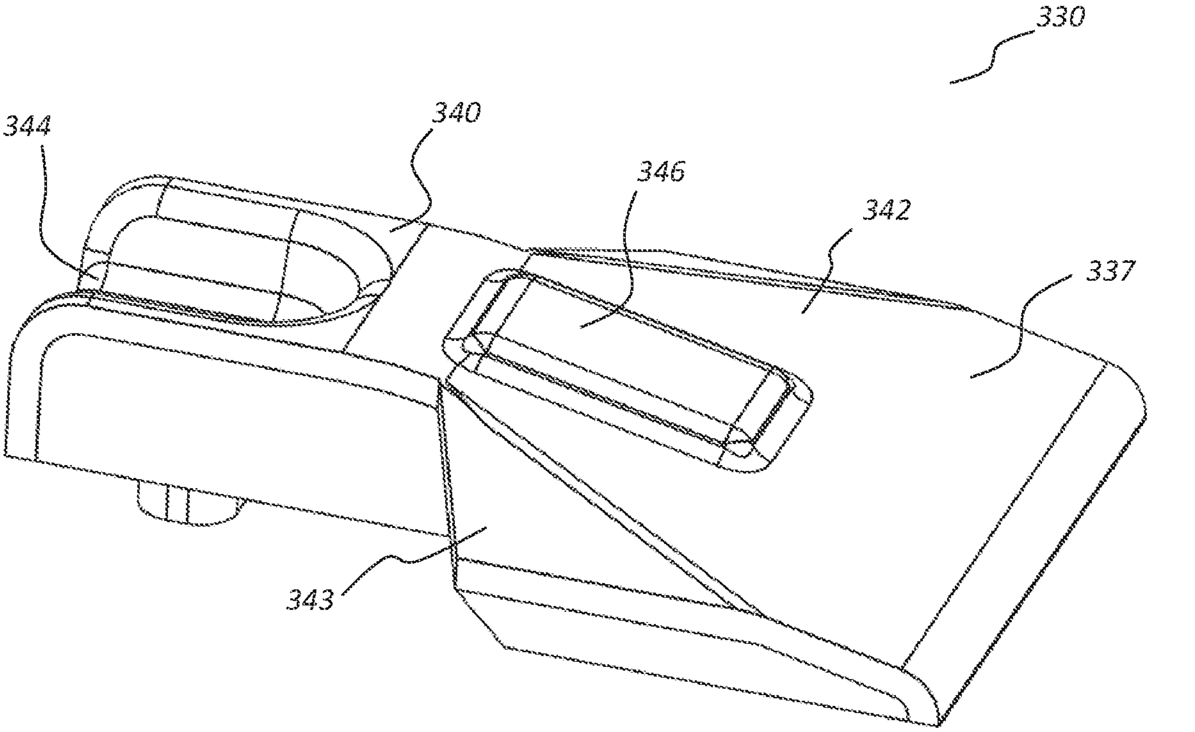
FIG. 9 illustrates an alternative embodiment of an upper body support that may be utilized in a patient positioning system as described herein.

FIG. 9 illustrates another embodiment of an upper body support 330 which may be utilized in a patient positioning system as described herein (including patient positioning systems 100 and 200). The upper body support 330 includes a head section 340 with head depression 344 and a scapulae section 342 with scapular bump 346, and is in many respects similar to upper body support 130. The upper body support 330 further includes a pair of sloped posterior shoulder surfaces 343. The shoulder surfaces 343 are aligned with the scapular bump 346 and angle downward from the upper surface 337. This beneficially allows the patient's shoulders to drop down into a favorable position, but still provide some support to the shoulders so that they are not left freely suspended.

Figure 10A:
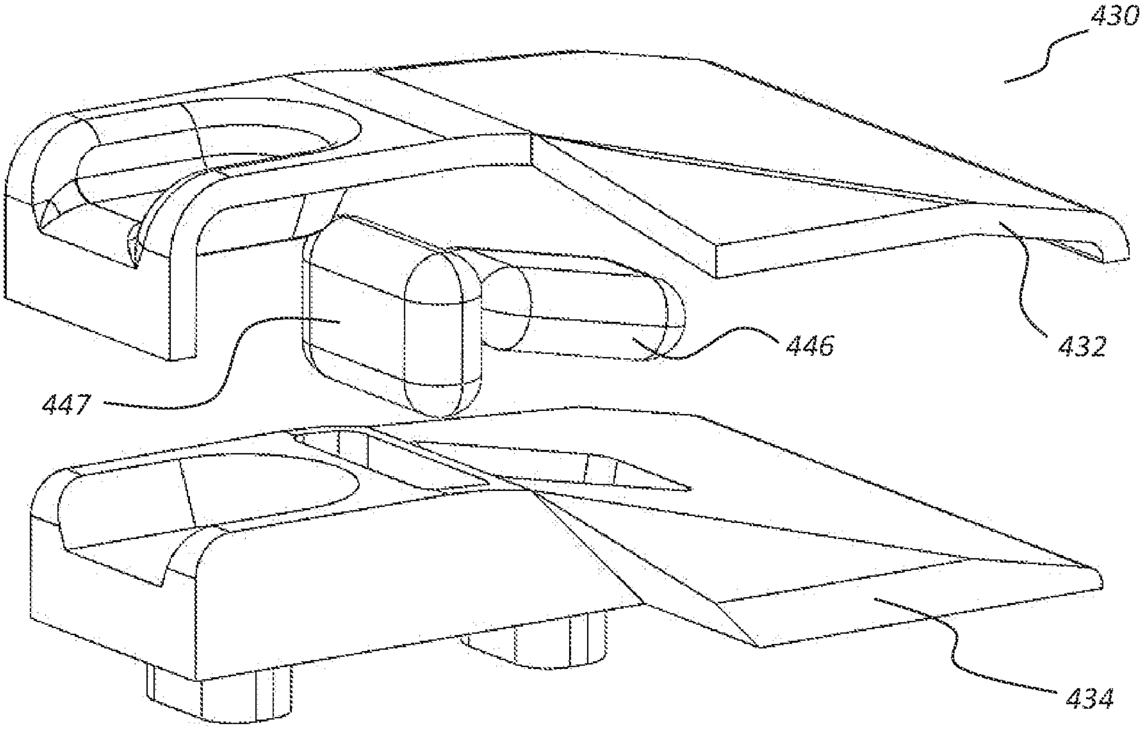
FIGS. 10A and 10B illustrate an alternative embodiment of an upper body support that may be utilized in a patient positioning system as described herein, the upper body support having selectively inflatable bladders that enable selective adjustment of patient position upon the support.
Figure 10B:
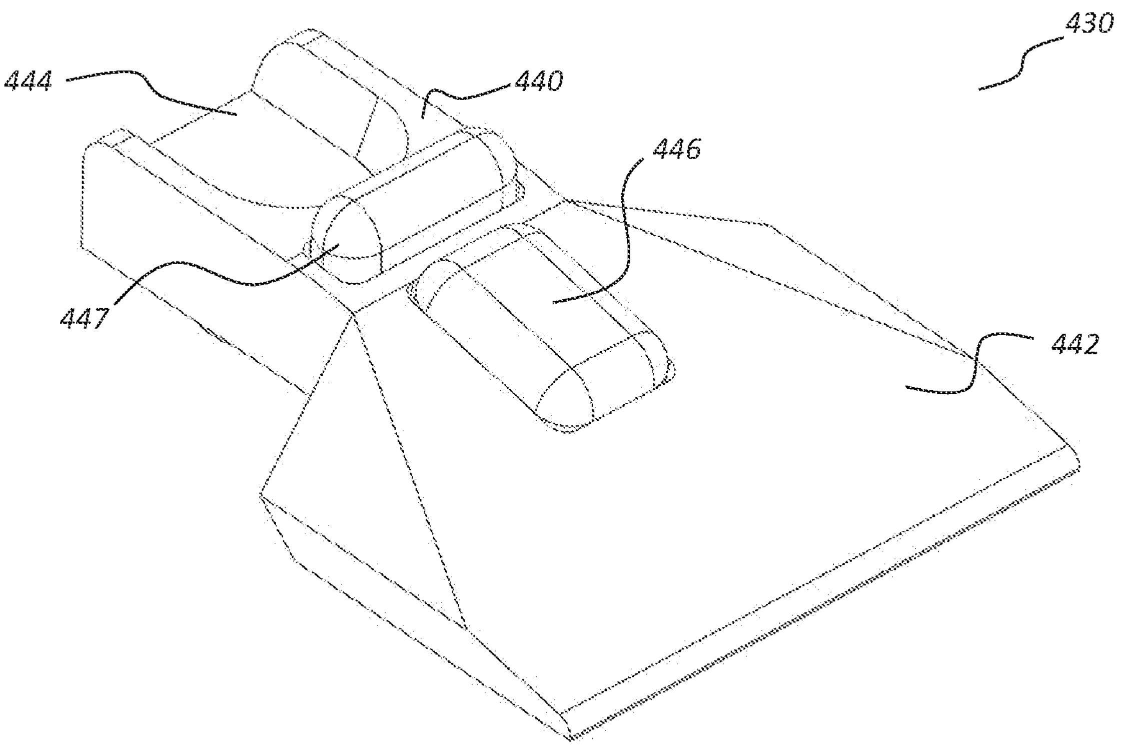

FIGS. 10A and 10B illustrate another embodiment of an upper body support 430 which may be utilized in a patient positioning system as described herein (including patient positioning systems 100 and 200). FIG. 10A illustrates an exploded view while FIG. 10B illustrates the lower layer 434 with upper layer 432 removed to show positioning of bladders 446 and 447. The upper body support 430 includes a head section 440 with a head depression 444 and a scapulae section 442, and is in many respects similar to other upper body support embodiments described herein.

The illustrated upper body support 430 includes a selectively inflatable scapular bladder 446 and a selectively inflatable cervical bladder 447. As shown, the scapular bladder 446 is positioned generally at the lateral central portion of the scapulae section 442 and provides a function similar to the scapular bump component of other embodiments. That is, the scapular bladder, when inflated, promotes lifting of the patient chest and corresponding retraction of the shoulders. The cervical bladder 447 is placed generally behind the patient's neck to promote cervical extension when inflated.

The bladders 446 and 447 can include ports and valves to provide connection to one or more pumps (e.g., a hand or foot pump) to allow operating room personnel to control the degree of inflation of the bladders. The personnel can beneficially adjust the amount of chest lifting and/or cervical extension on the fly without having to readjust padding components and without having to add or remove padding components.

The upper layer 432 and lower layer 434 may be configured similar to the upper and lower layers of upper body support 130. That is, the upper layer 432 may be generally formed from a memory foam layer that encapsulates the bladders 446 and 447 while comfortably contacting the patient. The lower layer 434 is formed from a more supportive and firm foam material capable of holding the bladders 446 and 447 and providing the structural integrity of the support 430.

In some embodiments, the upper layer 432 may be secured to the lower layer 434 via straps (e.g., clastic straps) to enable easy attachment and removal. Such connection can also allow the upper layer 432 to move as needed relative to the lower layer 434 as the bladders 446 and 447 are inflated/deflated.

Figure 11A:
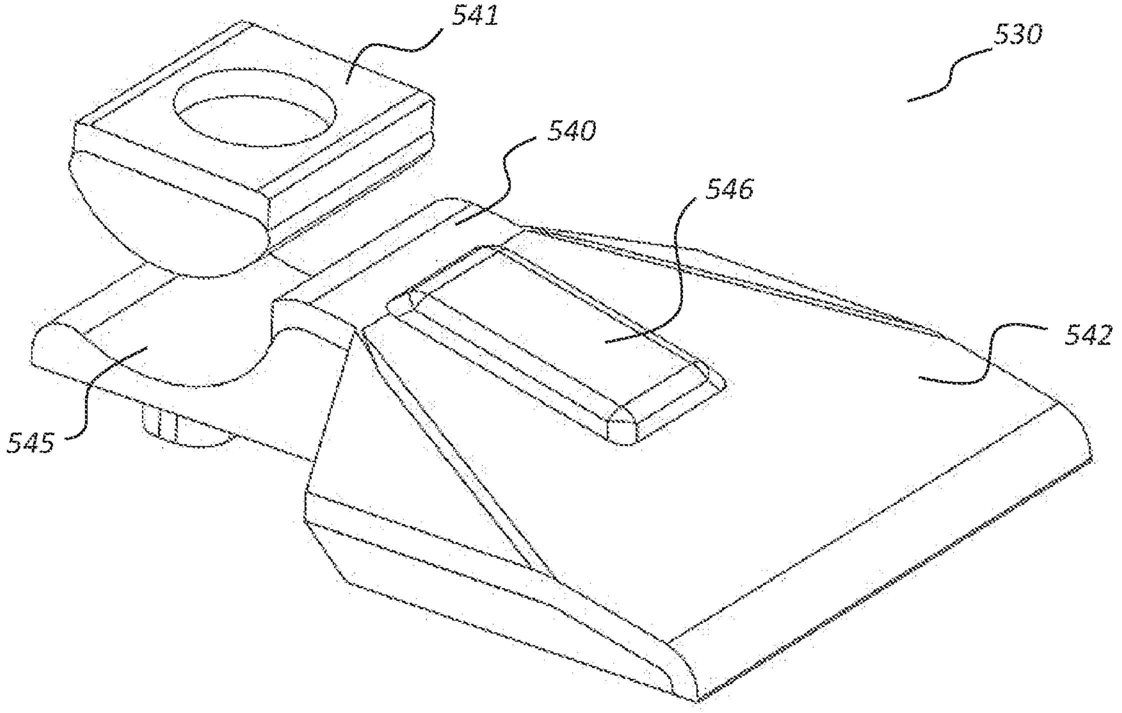
FIGS. 11A through 11C illustrate an alternative embodiment of an upper body support that may be utilized in a patient positioning system as described herein, the upper body support having an occipital pad that sits within a corresponding curve in an angularly adjustable fashion.
Figure 11B:
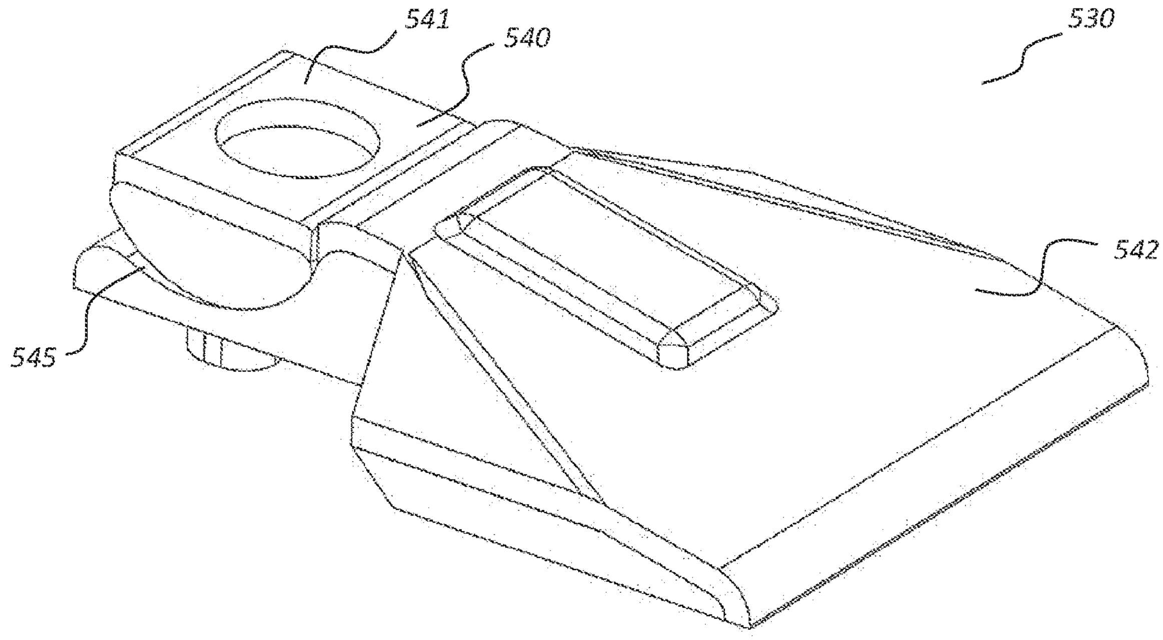
Figure 11C:
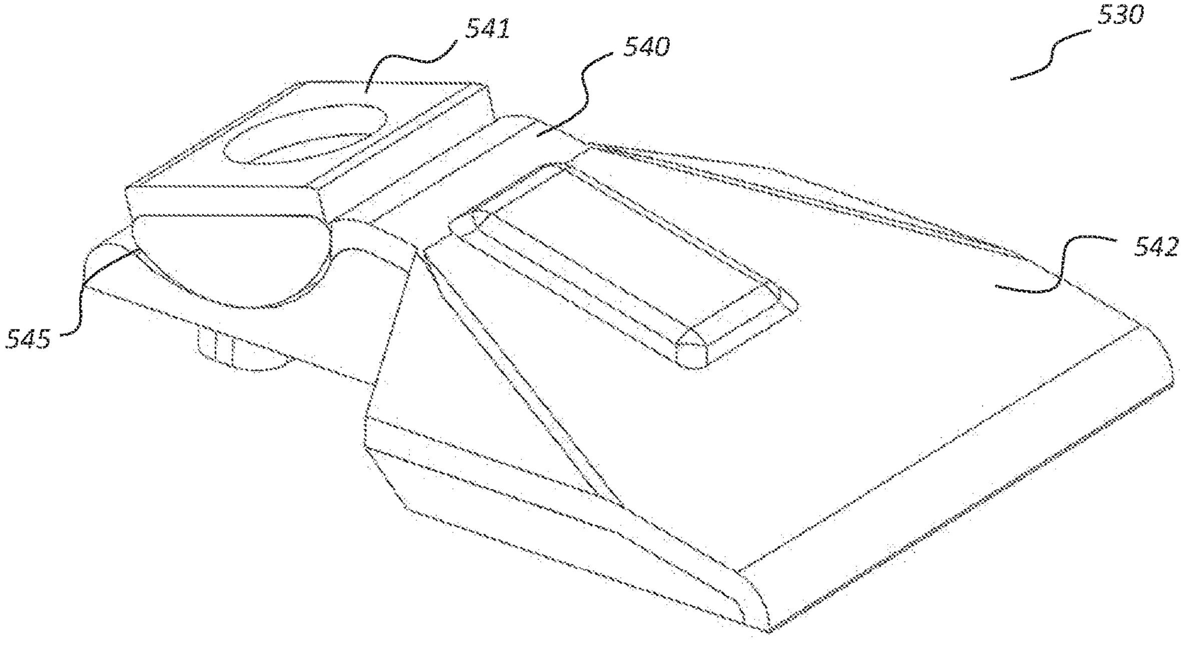

FIGS. 11A through 11C illustrate another embodiment of an upper body support 530 which may be utilized in a patient positioning system as described herein (including patient positioning systems 100 and 200). The illustrated upper body support 530 includes an occipital pad 541 configured with a curved bottom surface that matches a concave curve 545 of the head section 540 such that the occipital pad 541 can be rotated within the curve 545 in a "cam-like" fashion. This beneficially allows operating room personnel to adjust the angle of the occipital pad 541 and thereby adjust cervical flexion/extension of the patient.

The upper body support 530 may include a head section 540, scapulae section 542, and scapular bump 546, and can otherwise be similar to other upper body support embodiments described herein. FIG. 11A shows an exploded view of the support 530. FIGS. 11B and 11C show the occipital pad 541 in different positions relative to the curve 545 and the rest of the support 530.

Lower Body Support

FIGS. 7A-7D illustrate various views of the lower body support 150. The lower body support 150 includes a bottom surface 155 and an upper surface 157. A laterally extending apex 156 forms part of the upper surface 157 and is configured to lift and support the patient's legs at the posterior side of the knees. An upper leg section 160 extends downward from the apex 156, in a superior direction, to the bottom surface 155, and a lower leg section 162 extends downward from the apex 156, in an inferior direction, to the bottom surface 155.

The lower body support 150 also includes two leg depressions 164 that each extend longitudinally along the length of the lower body support 150. That is, the leg depressions 164 extend along the upper leg section 160, the apex 156, and the lower leg section 162. The leg depressions 164 function to allow the patient's legs to be cradled and supported by the upper surface 157, outer sidewalls 152, and a median 154 of the support. As shown, the outer sidewalls 152 and/or median 154 may have a variable thickness that increases in width toward an inferior end 153 of the device, thus making the leg depressions 164 narrower toward the inferior end 153 of the device.

The lower leg section 162 may also include a pair of heel depressions 165, each positioned within a respective leg depression 164. The heel depressions 165 allow the heels of the patient to sink lower than the upper surface of the rest of the leg depression 164 so that pressure may be taken off the posterior portion of the heel and so the calf and ankle may be better cradled and supported by the support. The heel depressions 165 are preferably formed as longitudinal slots with lengths that accommodates for variation in patient height and leg size. The heel depressions 165 may each have a length, for example, of at least about 4 inches, or at least about 6 inches, or at least about 8 inches, and may extend up to about 12, or 14, or 16 inches.

The slope of the upper leg section 160 may be at an angle of about 15° to about 30°, or about 20° to about 25°. The lower leg section 162 preferably has a gentler slope of about 5° to about 15°. The apex 156, at its highest portions, is preferably about 5 to about 9 inches, more preferably about 6 to about 8 inches, above the bottom surface 155. The leg depressions 164, at their lowest portions, are preferably about 1.5 to about 3 inches below the upper surfaces of the adjacent outer sidewalls 152 and median 154. These structural dimensions have been found to provide effective and comfortable support to the patient's lower body, particularly during extended times often associated with spinal procedures.

Figure 7A:
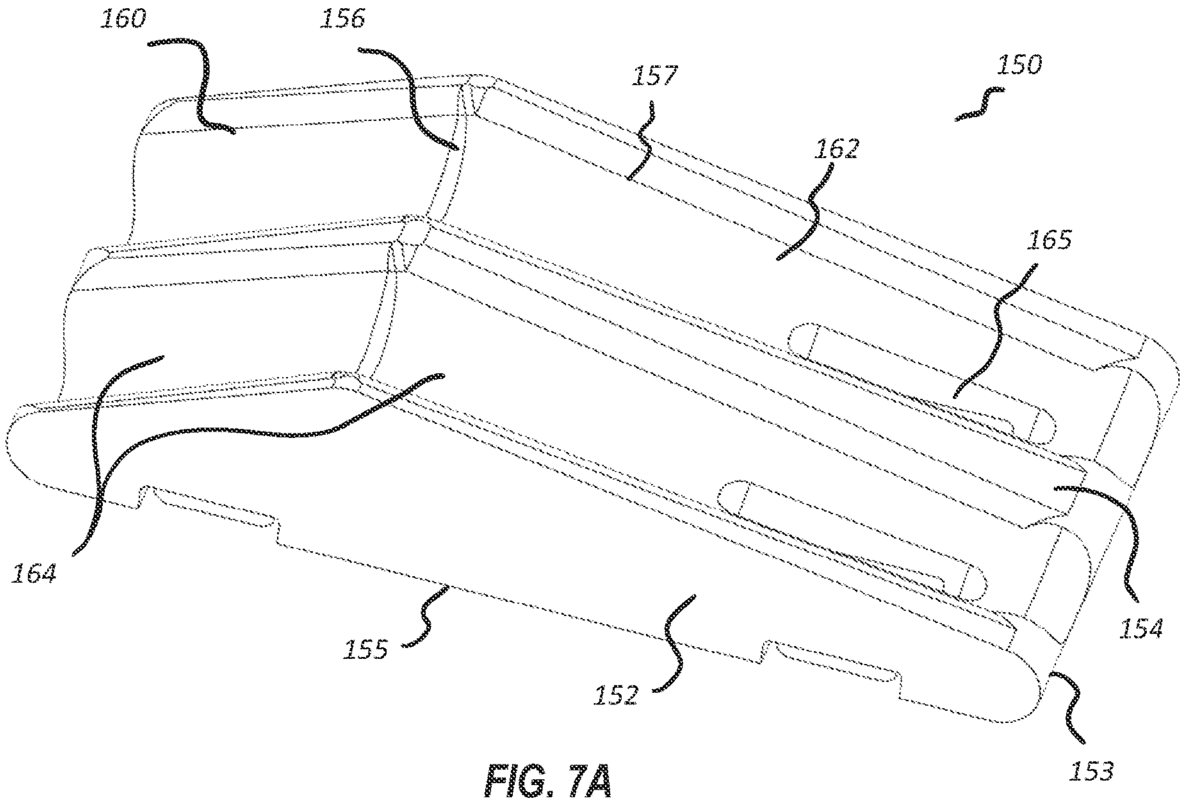
FIGS. 7A-7D illustrate detailed views of the lower body support.
Figure 7B:
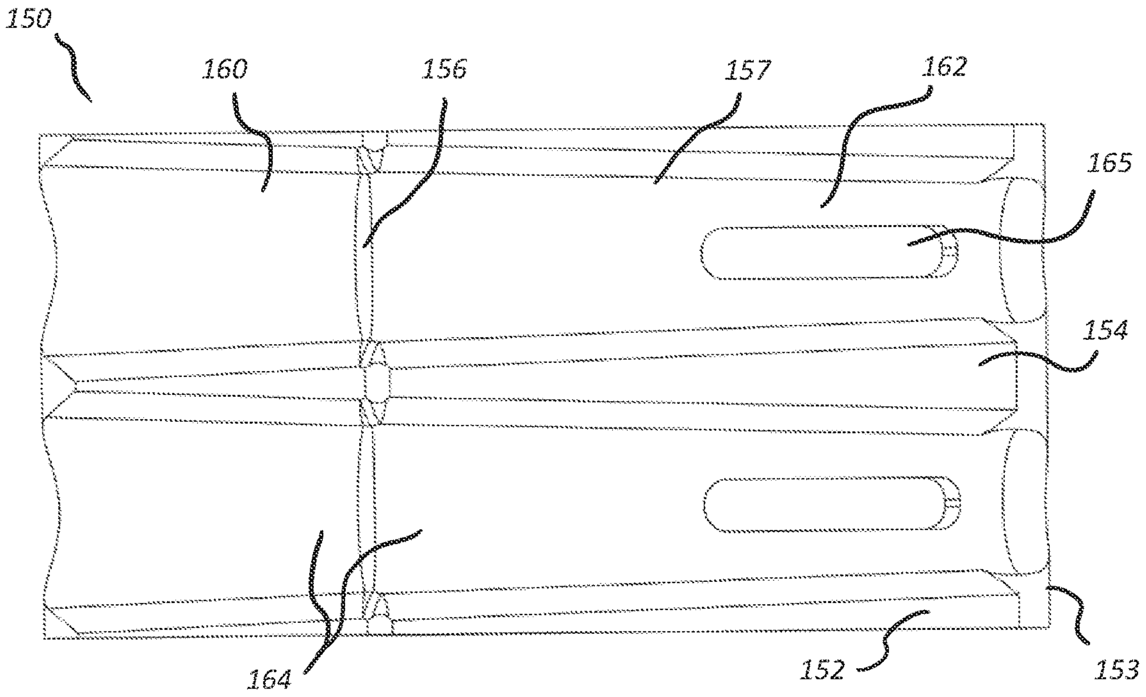
Figure 7C:
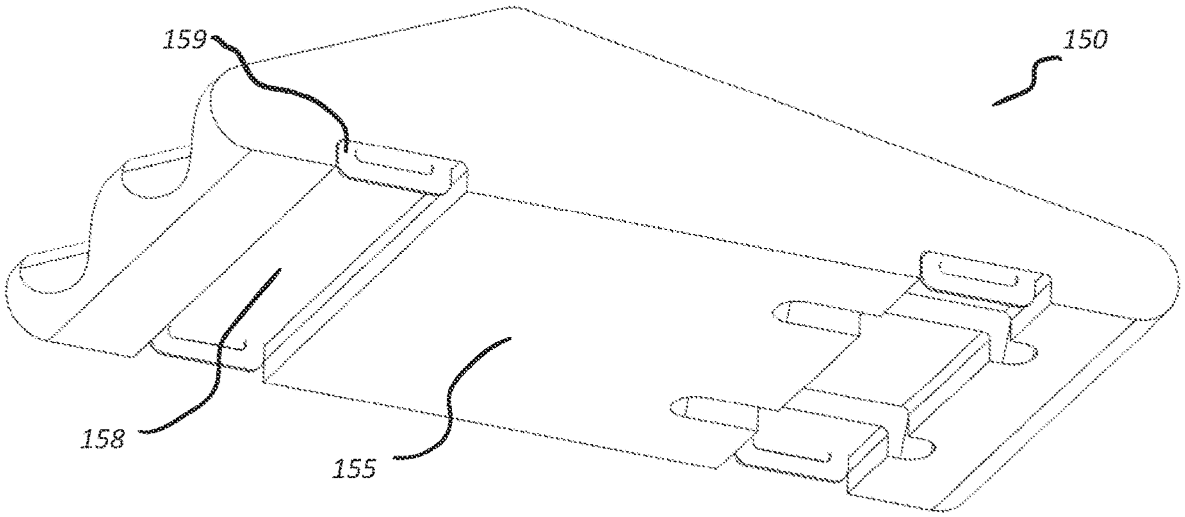
Figure 7D:
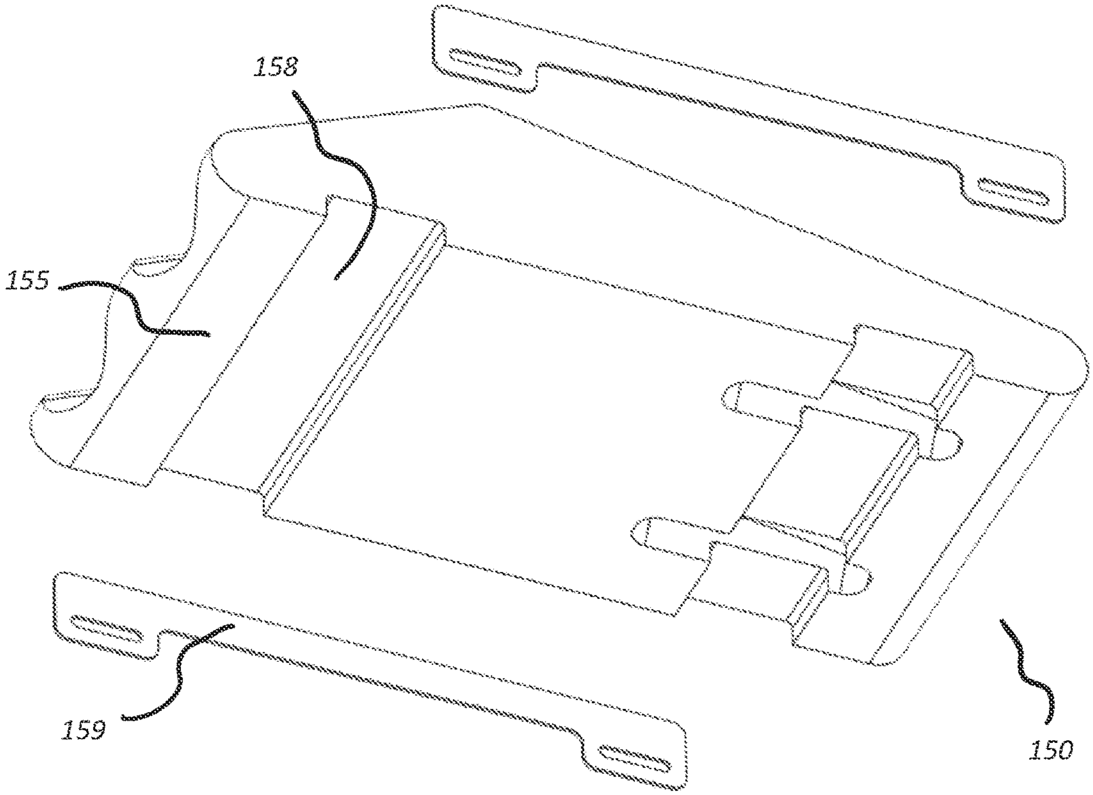

As best illustrated in FIGS. 7C and 7D, the lower body support 150 may include one or more strap channels 158 that extend laterally across the bottom surface 155 of the support. The illustrated embodiment includes multiple channels 158, though other embodiments may include more, or may include a single channel (see the lower body support 250 of FIG. 8A, for example). One or more strap supports 159 may be integrated into the lower body support 150 such that the strap supports 159 are disposed within the strap channels 158. Preferably, the strap supports 159 extend no lower than the bottom surface 155 of the lower body support 150. For example, the bottom surface of the strap supports 159 may be substantially flush with the bottom surface 155 of the lower body support 150.

As shown, the strap supports 159 may be formed within longitudinal pieces that combine multiple strap supports 159. This allows for larger structural pieces to be integrated into the lower body support so that forces applied to the strap supports 159 may be better spread throughout the support device. As with other strap supports described herein, the strap supports 159 are formed of a material with greater rigidity than the foam material within which it is integrated. The portions of the lower leg support 150 other than the strap supports 159 may be formed of a foam material having approximately medium firmness, such as foam material with an ILD of about 25 to about 90 pounds.

Although the lower body support 150 is described herein in the context of the overall patient positioning system 100, it will be understood that it may be utilized in different applications where supporting, cushioning, and/or positioning of a patient's legs is desirable.

CONCLUSION

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, or less than 1% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an," and "the" do not exclude plural referents unless the context clearly dictates otherwise. Thus, for example, an embodiment referencing a singular referent (e.g., "widget") may also include two or more such referents.

It will also be appreciated that embodiments described herein may include properties, features (e.g., ingredients, components, members, elements, parts, and/or portions) described in other embodiments described herein. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. A patient positioning system configured to position the cervical spine of a patient in preparation for an anterior cervical procedure, the system comprising:
- a base section having a superior portion and an inferior portion;
- an upper body support attachable to the superior portion of the base section and configured to support the head and upper torso of the patient in a manner that aids in opening cervical spine disk space; and
- a traction strap assembly comprising two separate upper strap segments attachable to the superior portion of the base section and configured to extend from the superior portion of the base section up around the shoulders of the patient and along the anterior side of the patient to a lower terminal end,
- wherein the traction strap assembly is configured to move the shoulders inferiorly when the lower terminal end is pulled inferiorly.

2. The system of claim 1, wherein the base section includes multiple layers, the multiple layers including at least two separate types of foam of varying firmness.

3. The system of claim 1, further comprising a lower body support positionable upon the inferior portion of the base section and configured to support the legs of the patient.

4. The system of claim 1, wherein the traction strap assembly is configured in a Y shape that includes the two separate upper strap segments that extend from respective upper terminal ends over the shoulders of the patient before joining at a junction, and a single lower strap segment that joins the upper strap segments at the junction, extends inferiorly from the junction, and provides the lower terminal end of the traction strap assembly, wherein the upper terminal ends of the upper strap segments are attachable to the superior portion of the base section.

5. The system of claim 4, wherein the upper terminal ends of the upper strap segments of the traction strap assembly are attachable to corresponding upper strap supports disposed on the superior portion of the base section, wherein the upper strap supports are selected from slotted plates, clamps, clasps, buckles, cams, tiedowns, and ratchets.

6. The system of claim 1, wherein the upper body support includes one or more selectively inflatable bladders for adjusting patient position upon the upper body support.

7. The system of claim 1, wherein the upper body support comprises:
- a bottom surface and an upper surface;
- a laterally extending apex forming part of the upper surface and configured for supporting the patient's neck;
- a head section extending horizontally from the apex or sloping downward and in a superior direction from the apex to the bottom surface, the head section including a head depression for allowing the portion of the patient's head above the neck to sink into the head depression; and a scapulae section joined to the apex and sloping downward therefrom, in an inferior direction, to the bottom surface.

8. The system of claim 7, wherein the head depression is open on a superior end of the upper body support.

9. The system of claim 7, wherein the apex sits about 2.5 to about 5.5 inches above the bottom surface.

10. The system of claim 7, wherein the scapulae section slopes downward from the apex at an angle of about 5° to about 20°.

11. The system of claim 7, wherein the scapulae section includes a scapular bump projecting upwards from an upper surface of the scapulae section, the scapular bump being configured to support a portion of the patient's back between the scapulae.

12. The system of claim 7, wherein at least a portion of the scapulae section has a width greater than a width of the head section.

13. The system of claim 7, wherein the upper body support further comprises a pair of downward sloping shoulder supports.

14. The system of claim 7, wherein the upper body support further comprises an occipital pad with a curved bottom surface that matches a curved surface of the head section such that the occipital pad can be selectively angularly adjusted.

15. The system of claim 3, wherein the lower body support comprises:

a bottom surface and an upper surface;

a laterally extending apex forming part of the upper surface and configured for supporting posterior sides of knees of the patient;

an upper leg section joined to the apex and sloping downward therefrom, in a superior direction, to the bottom surface;

a lower leg section joined to the apex and sloping downward therefrom, in an inferior direction, to the bottom surface; and two leg depressions that each extend longitudinally along the upper leg section, across the apex, and along the lower leg section.

16. The system of claim 15, wherein the leg depressions define a longitudinally extending median disposed between the two leg depressions, and wherein the median increases in width toward an inferior end.

17. The system of claim 15, wherein the leg depressions define outer sidewalls on opposing outer sides of the leg depressions, and wherein the outer sidewalls increase in width toward an inferior end.

18. The system of claim 15, wherein the lower body support further comprises one or more integrated strap supports configured for receiving one or more straps, wherein the one or more strap supports are inlayed such that each have a bottom surface that extends no lower than the bottom surface of the lower body support.

19. The system of claim 15, wherein the lower leg section further comprises heel depressions each disposed in respective leg depressions, the heel depressions allowing the heels of the patient to sink lower than the upper surface of the leg depressions.

20. The system of claim 1, wherein the lower terminal end of the traction strap assembly is configured to remain unattached to the base section to permit intermittent pulling of the lower terminal end by operating room staff.

21. A patient positioning system configured to position the cervical spine of a patient in preparation for an anterior cervical procedure, the system comprising:

a base section having a superior portion and an inferior portion;

an upper body support attachable to the superior portion of the base section and configured to support the head and upper torso of the patient in a manner that aids in opening cervical spine disk space, the upper body support comprising a bottom surface and an upper surface, a laterally extending apex forming part of the upper surface and configured for supporting the patient's neck, a head section extending horizontally from the apex or sloping downward and in a superior direction from the apex to the bottom surface, the head section including a head depression for allowing the portion of the patient's head above the neck to sink into the head depression, and a scapulae section joined to the apex and sloping downward therefrom, in an inferior direction, to the bottom surface; and a traction strap assembly comprising upper strap segments attachable to the superior portion of the base section and configured to extend from the superior portion of the base section up around the shoulders of the patient and along the anterior side of the patient to a lower terminal end, the traction strap assembly being configured so as to move the shoulders inferiorly when the terminal end is pulled inferiorly.

22. A patient positioning system configured to position the cervical spine of a patient in preparation for an anterior cervical procedure, the system comprising:

a base section having a superior portion and an inferior portion; and a lower body support positionable upon the inferior portion of the base section and configured to support the legs of the patient, the lower body support comprising a bottom surface and an upper surface, a laterally extending apex forming part of the upper surface and configured for supporting posterior sides of knees of the patient, an upper leg section joined to the apex and sloping downward therefrom, in a superior direction, to the bottom surface, a lower leg section joined to the apex and sloping downward therefrom, in an inferior direction, to the bottom surface, and two leg depressions that each extend longitudinally along the upper leg section, across the apex, and along the lower leg section; and a traction strap assembly attachable to the base section and configured to extend from the base section up around the shoulders of the patient and along the anterior side of the patient to a lower terminal end, the traction strap assembly being configured so as to move the shoulders inferiorly when the lower terminal end is pulled inferiorly.

* * * * *